(12) United States Patent
Savagaonkar et al.

(10) Patent No.: US 11,921,905 B2
(45) Date of Patent: Mar. 5, 2024

(54) SECURE COLLABORATION BETWEEN PROCESSORS AND PROCESSING ACCELERATORS IN ENCLAVES

(71) Applicant: Google LLC, Mountain View, CA (US)

(72) Inventors: Uday Savagaonkar, Redmond, WA (US); Eric Northup, Seattle, WA (US)

(73) Assignee: Google LLC, Mountain View, CA (US)

(*) Notice: Subject to any disclaimer, the term of this patent is extended or adjusted under 35 U.S.C. 154(b) by 22 days.

(21) Appl. No.: 17/046,535

(22) PCT Filed: Jul. 18, 2018

(86) PCT No.: PCT/US2018/042695
§ 371 (c)(1),
(2) Date: Oct. 9, 2020

(87) PCT Pub. No.: WO2019/212581
PCT Pub. Date: Nov. 7, 2019

(65) Prior Publication Data
US 2021/0034788 A1 Feb. 4, 2021

Related U.S. Application Data

(60) Provisional application No. 62/672,680, filed on May 17, 2018, provisional application No. 62/664,438, filed on Apr. 30, 2018.

(51) Int. Cl.
*G06F 21/72* (2013.01)
*G06F 13/42* (2006.01)
(Continued)

(52) U.S. Cl.
CPC .......... *G06F 21/72* (2013.01); *G06F 13/4221* (2013.01); *G06F 21/602* (2013.01); *G06F 21/79* (2013.01); *G06F 2213/0026* (2013.01)

(58) Field of Classification Search
CPC ........ G06F 21/72; G06F 21/602; G06F 21/79; G06F 21/78; G06F 13/4221; G06F 2213/0026; H04L 63/0428; H04L 63/06
See application file for complete search history.

(56) References Cited

U.S. PATENT DOCUMENTS 5,970,250 A 10/1999 England et al.
6,779,112 B1 8/2004 Guthery
(Continued)

FOREIGN PATENT DOCUMENTS

CN 1685297 A 10/2005
CN 103826161 A 5/2014
(Continued)

OTHER PUBLICATIONS

M. M. Ozdal, "Emerging Accelerator Platforms for Data Centers," in IEEE Design & Test, vol. 35, No. 1, pp. 47-54, Feb. 2018 (Year: 2018).*

(Continued)

*Primary Examiner* — Philip J Chea
*Assistant Examiner* — Sangseok Park
(74) *Attorney, Agent, or Firm* — Lerner David LLP

(57) ABSTRACT

Aspects of the disclosure relate to providing a secure collaboration between one or more PCIe accelerators and an enclave. An example system may include a PCIe accelerator apparatus. The PCIs accelerator apparatus may include the one or more PCIe accelerators and a microcontroller configured to provide a cryptographic identity to the PCIe accelerator apparatus. The PCIe accelerator apparatus may be configured to use the cryptographic identity to establish communication between the PCIe accelerator apparatus the enclave.

18 Claims, 5 Drawing Sheets

(51) Int. Cl.
*G06F 21/60* (2013.01)
*G06F 21/79* (2013.01)

(56) References Cited

U.S. PATENT DOCUMENTS

| | | | |
|---|---|---|---|
| 6,938,159 | B1 | 8/2005 | O'Connor et al. |
| 7,624,433 | B1 | 11/2009 | Clark et al. |
| 7,661,131 | B1 | 2/2010 | Shaw et al. |
| 7,788,711 | B1 | 8/2010 | Sun et al. |
| 7,904,940 | B1 | 3/2011 | Hernacki et al. |
| 8,145,909 | B1 | 3/2012 | Agrawal et al. |
| 8,155,036 | B1 | 4/2012 | Brenner et al. |
| 8,220,035 | B1 | 7/2012 | Pravetz et al. |
| 8,245,285 | B1 | 8/2012 | Ravishankar et al. |
| 8,353,016 | B1 | 1/2013 | Pravetz et al. |
| 8,442,527 | B1 | 5/2013 | Machiraju et al. |
| 8,631,486 | B1 | 1/2014 | Friedman et al. |
| 9,246,690 | B1 | 1/2016 | Roth et al. |
| 9,251,047 | B1 * | 2/2016 | McKelvie ............... G06F 21/85 |
| 9,374,370 | B1 | 6/2016 | Bent, II et al. |
| 9,444,627 | B2 | 9/2016 | Varadarajan et al. |
| 9,444,948 | B1 | 9/2016 | Ren et al. |
| 9,460,077 | B1 | 10/2016 | Casey |
| 9,531,727 | B1 | 12/2016 | Himberger et al. |
| 9,584,517 | B1 | 2/2017 | Roth et al. |
| 9,615,253 | B1 | 4/2017 | Osborn |
| 9,710,748 | B2 | 7/2017 | Ross et al. |
| 9,735,962 | B1 * | 8/2017 | Yang .................... H04L 9/0877 |
| 9,754,116 | B1 | 9/2017 | Roth et al. |
| 9,779,352 | B1 | 10/2017 | Hyde et al. |
| 9,940,456 | B2 | 4/2018 | Nesher et al. |
| 10,007,464 | B1 | 6/2018 | Blinzer |
| 10,021,088 | B2 | 7/2018 | Innes et al. |
| 10,375,177 | B1 | 8/2019 | Bretan |
| 10,382,202 | B1 | 8/2019 | Ohsie et al. |
| 10,530,777 | B2 | 1/2020 | Costa |
| 10,685,131 | B1 | 6/2020 | Lunsford et al. |
| 11,210,412 | B1 | 12/2021 | Ghetti et al. |
| 2003/0005118 | A1 | 1/2003 | Williams |
| 2003/0074584 | A1 | 4/2003 | Ellis |
| 2003/0200431 | A1 | 10/2003 | Stirbu |
| 2003/0202523 | A1 | 10/2003 | Buswell et al. |
| 2003/0236975 | A1 | 12/2003 | Birk et al. |
| 2004/0030764 | A1 | 2/2004 | Birk et al. |
| 2004/0093522 | A1 | 5/2004 | Bruestle et al. |
| 2005/0050316 | A1 | 3/2005 | Peles |
| 2005/0144437 | A1 | 6/2005 | Ransom et al. |
| 2005/0166191 | A1 | 7/2005 | Kandanchatha et al. |
| 2005/0198622 | A1 | 9/2005 | Ahluwalia et al. |
| 2005/0204345 | A1 | 9/2005 | Rivera et al. |
| 2006/0021004 | A1 | 1/2006 | Moran et al. |
| 2006/0021010 | A1 | 1/2006 | Atkins et al. |
| 2006/0095969 | A1 | 5/2006 | Portolani et al. |
| 2006/0130131 | A1 | 6/2006 | Pai et al. |
| 2006/0174037 | A1 | 8/2006 | Bemardi et al. |
| 2006/0225055 | A1 | 10/2006 | Tieu |
| 2006/0274695 | A1 | 12/2006 | Krishnamurthi et al. |
| 2008/0005573 | A1 | 1/2008 | Morris et al. |
| 2008/0005798 | A1 | 1/2008 | Ross |
| 2008/0091948 | A1 | 4/2008 | Hofmann et al. |
| 2008/0244257 | A1 | 10/2008 | Vaid et al. |
| 2009/0077655 | A1 | 3/2009 | Sermersheim et al. |
| 2009/0228951 | A1 | 9/2009 | Ramesh et al. |
| 2010/0150352 | A1 | 6/2010 | Mansour et al. |
| 2010/0313246 | A1 | 12/2010 | Irvine et al. |
| 2011/0075652 | A1 | 3/2011 | Ogura |
| 2011/0113244 | A1 | 5/2011 | Chou et al. |
| 2011/0225559 | A1 | 9/2011 | Nishide |
| 2012/0151568 | A1 | 6/2012 | Pieczul et al. |
| 2012/0159184 | A1 | 6/2012 | Johnson et al. |
| 2012/0272217 | A1 | 10/2012 | Bates |
| 2012/0275601 | A1 | 11/2012 | Matsuo |
| 2013/0111549 | A1 | 5/2013 | Sowatskey et al. |
| 2013/0125197 | A1 | 5/2013 | Pravetz et al. |
| 2013/0159726 | A1 | 6/2013 | McKeen et al. |
| 2013/0166907 | A1 | 6/2013 | Brown et al. |
| 2013/0247164 | A1 | 9/2013 | Hoggan |
| 2013/0312074 | A1 | 11/2013 | Sarawat et al. |
| 2013/0312117 | A1 | 11/2013 | Sapp, II et al. |
| 2014/0047532 | A1 | 2/2014 | Sowatskey |
| 2014/0086406 | A1 | 3/2014 | Polzin et al. |
| 2014/0089617 | A1 | 3/2014 | Polzin et al. |
| 2014/0089712 | A1 | 3/2014 | Machnicki et al. |
| 2014/0157410 | A1 | 6/2014 | Dewan et al. |
| 2014/0189246 | A1 | 7/2014 | Xing et al. |
| 2014/0189326 | A1 | 7/2014 | Leslie et al. |
| 2014/0267332 | A1 | 9/2014 | Chhabra et al. |
| 2014/0281544 | A1 | 9/2014 | Paczkowski et al. |
| 2014/0281560 | A1 | 9/2014 | Ignatchenko et al. |
| 2014/0297962 | A1 | 10/2014 | Rozas et al. |
| 2014/0337983 | A1 | 11/2014 | Kang et al. |
| 2015/0007291 | A1 | 1/2015 | Miller |
| 2015/0033012 | A1 | 1/2015 | Scarlata et al. |
| 2015/0089173 | A1 | 3/2015 | Chhabra et al. |
| 2015/0131919 | A1 | 5/2015 | Dewangan et al. |
| 2015/0178226 | A1 | 6/2015 | Scarlata et al. |
| 2015/0200949 | A1 | 7/2015 | Willhite et al. |
| 2015/0249645 | A1 | 9/2015 | Sobel et al. |
| 2015/0281279 | A1 | 10/2015 | Smith et al. |
| 2016/0036786 | A1 | 2/2016 | Gandhi |
| 2016/0080379 | A1 | 3/2016 | Saboori et al. |
| 2016/0110540 | A1 | 4/2016 | Narendra Trivedi et al. |
| 2016/0134599 | A1 | 5/2016 | Ross et al. |
| 2016/0147979 | A1 | 5/2016 | Kato |
| 2016/0171248 | A1 | 6/2016 | Nesher et al. |
| 2016/0173287 | A1 | 6/2016 | Bowen |
| 2016/0179702 | A1 | 6/2016 | Chhabra et al. |
| 2016/0188350 | A1 | 6/2016 | Shah et al. |
| 2016/0188873 | A1 | 6/2016 | Smith et al. |
| 2016/0188889 | A1 | 6/2016 | Narendra Trivedi et al. |
| 2016/0219044 | A1 | 7/2016 | Karunakaran et al. |
| 2016/0219060 | A1 | 7/2016 | Karunakaran et al. |
| 2016/0226913 | A1 | 8/2016 | Sood et al. |
| 2016/0283411 | A1 | 9/2016 | Sheller et al. |
| 2016/0285858 | A1 | 9/2016 | Li et al. |
| 2016/0316025 | A1 | 10/2016 | Lloyd et al. |
| 2016/0330301 | A1 * | 11/2016 | Raindel ............... H04L 63/0485 |
| 2016/0350534 | A1 | 12/2016 | Poornachandran et al. |
| 2016/0359965 | A1 | 12/2016 | Murphy et al. |
| 2016/0366123 | A1 | 12/2016 | Smith et al. |
| 2016/0371540 | A1 | 12/2016 | Pabbichetty |
| 2016/0380985 | A1 | 12/2016 | Chhabra et al. |
| 2017/0093572 | A1 | 3/2017 | Hunt et al. |
| 2017/0126660 | A1 | 5/2017 | Brannon |
| 2017/0126661 | A1 | 5/2017 | Brannon |
| 2017/0185766 | A1 | 6/2017 | Narendra Trivedi et al. |
| 2017/0201380 | A1 | 7/2017 | Schaap et al. |
| 2017/0223080 | A1 | 8/2017 | Velayudhan et al. |
| 2017/0256304 | A1 | 9/2017 | Poornachandran et al. |
| 2017/0264643 | A1 | 9/2017 | Bhuiyan et al. |
| 2017/0286320 | A1 | 10/2017 | Chhabra et al. |
| 2017/0286721 | A1 | 10/2017 | King |
| 2017/0331815 | A1 | 11/2017 | Pawar et al. |
| 2017/0338954 | A1 | 11/2017 | Yang et al. |
| 2017/0346848 | A1 | 11/2017 | Smith et al. |
| 2017/0353319 | A1 | 12/2017 | Scarlata et al. |
| 2017/0364908 | A1 | 12/2017 | Smith et al. |
| 2017/0366359 | A1 | 12/2017 | Scarlata et al. |
| 2018/0059917 | A1 | 3/2018 | Takehara |
| 2018/0069708 | A1 | 3/2018 | Thakore |
| 2018/0089468 | A1 | 3/2018 | Rozas et al. |
| 2018/0097809 | A1 | 4/2018 | Chakrabarti et al. |
| 2018/0113811 | A1 | 4/2018 | Xing |
| 2018/0114012 | A1 | 4/2018 | Sood et al. |
| 2018/0114013 | A1 * | 4/2018 | Sood .................... G06F 21/606 |
| 2018/0145968 | A1 | 5/2018 | Rykowski et al. |
| 2018/0183578 | A1 | 6/2018 | Chakrabarti et al. |
| 2018/0183580 | A1 | 6/2018 | Scarlata et al. |
| 2018/0183586 | A1 | 6/2018 | Bhargav-Spantzel et al. |
| 2018/0191695 | A1 | 7/2018 | Lindemann |
| 2018/0210742 | A1 | 7/2018 | Costa |
| 2018/0211018 | A1 | 7/2018 | Yang |
| 2018/0212971 | A1 | 7/2018 | Costa |
| 2018/0212996 | A1 | 7/2018 | Nedeltchev et al. |

(56) References Cited

U.S. PATENT DOCUMENTS

| | | |
|---|---|---|
| 2018/0213401 A1 | 7/2018 | Yang |
| 2018/0232517 A1 | 8/2018 | Roth et al. |
| 2018/0234255 A1 | 8/2018 | Fu |
| 2018/0278588 A1* | 9/2018 | Cela .................. H04L 63/1441 |
| 2018/0285560 A1 | 10/2018 | Negi et al. |
| 2018/0295115 A1 | 10/2018 | Kumar et al. |
| 2018/0300556 A1* | 10/2018 | Varerkar .............. G06N 3/0454 |
| 2018/0337920 A1 | 11/2018 | Stites et al. |
| 2018/0349649 A1 | 12/2018 | Martel et al. |
| 2018/0351941 A1 | 12/2018 | Chhabra |
| 2019/0026234 A1 | 1/2019 | Harnik et al. |
| 2019/0028460 A1 | 1/2019 | Bhargava et al. |
| 2019/0034617 A1 | 1/2019 | Scarlata et al. |
| 2019/0044724 A1* | 2/2019 | Sood .................... G06F 21/602 |
| 2019/0044729 A1 | 2/2019 | Chhabra et al. |
| 2019/0050551 A1 | 2/2019 | Goldman-Kirst et al. |
| 2019/0058577 A1 | 2/2019 | Bowman et al. |
| 2019/0058696 A1 | 2/2019 | Bowman et al. |
| 2019/0103074 A1 | 4/2019 | Chhabra et al. |
| 2019/0109877 A1 | 4/2019 | Samuel et al. |
| 2019/0147188 A1 | 5/2019 | Benaloh et al. |
| 2019/0149531 A1 | 5/2019 | Kakumani et al. |
| 2019/0158474 A1 | 5/2019 | Kashyap et al. |
| 2019/0163898 A1 | 5/2019 | Clebsch et al. |
| 2019/0197231 A1 | 6/2019 | Meier |
| 2019/0245882 A1 | 8/2019 | Kesavan et al. |
| 2019/0253256 A1 | 8/2019 | Saab et al. |
| 2019/0258811 A1 | 8/2019 | Ferraiolo et al. |
| 2019/0310862 A1 | 10/2019 | Mortensen et al. |
| 2020/0233953 A1 | 7/2020 | Palsson et al. |
| 2020/0387470 A1* | 12/2020 | Cui ......................... G06F 21/78 |

FOREIGN PATENT DOCUMENTS

| | | |
|---|---|---|
| CN | 106997438 A | 8/2017 |
| CN | 107111715 A | 8/2017 |
| CN | 107787495 A | 3/2018 |
| CN | 107851162 A | 3/2018 |
| EP | 1757067 A1 | 2/2007 |
| WO | 0143344 A1 | 6/2001 |
| WO | 2012082410 A2 | 6/2012 |
| WO | 2014062618 A1 | 4/2014 |
| WO | 2014158431 A1 | 10/2014 |
| WO | 2014196966 A1 | 12/2014 |
| WO | 2015066028 A1 | 5/2015 |
| WO | 2015094261 A1 | 6/2015 |
| WO | 2016209526 A1 | 12/2016 |
| WO | 2018027059 A1 | 2/2018 |

OTHER PUBLICATIONS

First Examination Report for Indian Patent Application No. 202047046246 dated Dec. 6, 2021. 5 pages.
International Preliminary Report on Patentability for International Application No. PCT/US2018/042695 dated Nov. 12, 2020. 9 pages.
International Preliminary Report on Patentability for International Application No. PCT/US2018/042625 dated Nov. 12, 2020. 12 pages.
International Preliminary Report on Patentability for International Application No. PCT/US2018/042684 dated Nov. 12, 2020. 12 pages.
The Next Platform, retrieved from https://www.nextplatform.com/2017/04/05/first-depth-look-googles-tpu-architecture/ (2017).
Google Cloud Platform, retrieved from https://cloudplatform.googleblog.com/2017/08/Titan-in-depth-security-in-plaintext.html (2017).
Jouppi, N., et al., "In-Datacenter Performance Analysis of a Tensor Processing Unit", 44th International Symposium on Computer Architecture (ISCA), (2017) 17 pgs.
McKeen, Frank, et al., "Intel® Software Guard Extensions (Intel® SGX) Support for Dynamic Memory Management Inside an Enclave", Intel Corporation (2016) 9 pgs.
"Proceedings of USENIX ATC '17 2017 USENIX Annual Technical Conference", USENIX, USENIX, The Advanced Computing Systems Association, Jul. 12, 2017 (Jul. 12, 2017), pp. 1-811, XP061023212, [retrieved on Jul. 12, 2017].
International Search Report and Written Opinion for PCT Application No. PCT/US2018/042695, dated Oct. 4, 2018. 16 pages.
Invitation to Pay Additional Fees, Communication Relating to the Results of the Partial International Search, and Provisional Opinion Accompanying the Partial Search Result for PCT Application No. PCT/US2018/042625, dated Oct. 8, 2018. 14 pages.
Invitation to Pay Additional Fees, Communication Relating to the Results of the Partial International Search, and Provisional Opinion Accompanying the Partial Search Result for PCT Application No. PCT/US2018/042684, dated Oct. 10, 2018. 14 pages.
International Search Report and Written Opinion for PCT Application No. PCT/US2018/042625, dated Nov. 30, 2018. 19 pages.
International Search Report and Written Opinion for PCT Application No. PCT/US2018/042684, dated Dec. 5, 2018. 19 pages.
First Examination Report for Indian Patent Application No. 202047046281 dated Dec. 7, 2021. 6 pages.
First Examination Report for Indian Patent Application No. 202047046012 dated Sep. 17, 2021. 7 pages.
Office Action for European Patent Application No. 18750026.9 dated May 9, 2022. 6 pages.
Office Action for European Patent Application No. 18753285.8 dated Jul. 5, 2022. 8 pages.
Extended European Search Report for European Patent Application No. 22207041.9 dated Feb. 10, 2023. 8 pages.
Office Action for Chinese Patent Application No. 201880092471.6 dated Aug. 31, 2023. 10 pages.
Office Action for Chinese Patent Application No. 201880092577.6 dated Sep. 11, 2023. 8 pages.

* cited by examiner

SECURE COLLABORATION BETWEEN PROCESSORS AND PROCESSING ACCELERATORS IN ENCLAVES

CROSS-REFERENCE TO RELATED APPLICATION

The present application is a national phase entry under 35 U.S.C. § 371 of International Application No. PCT/US2018/042695, filed Jul. 18, 2018, which claims the benefit of the filing date of U.S. Provisional Application No. 62/664,438, filed Apr. 30, 2018 and U.S. Provisional Application No. 62/672,680, filed May 17, 2018, the disclosure of which is hereby incorporated herein by reference.

BACKGROUND

Enclave technologies may enable software programmers to develop secure applications that are contained inside secure execution environments called enclaves. An application that runs inside an enclave typically has safeguards like memory and code integrity, and memory encryption. These safeguards protect the enclave from code that executes outside of the enclave, like the operating system, hypervisor, or other system software. In cloud-based computing, this can provide safeguards against intrusions by all sorts of actors, including personnel of the cloud operator. For instance, cloud-based machine learning workloads can include very sensitive information, such as personal data or location information. These workloads can also consume computational resources from central processing units (CPUs) as well as from various processing accelerators. Protecting the integrity of such workloads without compromising efficiency is an important goal for such systems. For instance, moving the processing parts of the workload from the accelerators back to the CPU and running them inside a CPU enclave may be useful from security perspective, but may dramatically reduce efficiency of the computations.

SUMMARY

Aspects of the disclosure provide a system for providing a secure collaboration between one or more PCIe accelerators and an enclave. The system includes an PCIe accelerator apparatus including the one or more PCIe accelerators and a microcontroller configured to provide a cryptographic identity to the PCIe accelerator apparatus. The PCIe accelerator apparatus is configured to use the cryptographic identity to establish communication between the PCIe accelerator apparatus the enclave.

In one example, the system also includes a circuit board on each of the one or more PCIe accelerators and the microcontroller are arranged. In another example, each of the one or more PCIe accelerators is a tensor processing unit. In another example, each of the one or more PCIe accelerators is a graphical processing unit. In another example, the PCIe accelerator apparatus further comprises an application processor configured to communicate with the enclave. In this example, the application processor is incorporated into the microcontroller. In addition or alternatively, the application processor further includes a dedicated function for communicating with an operating system of a computing device on which the enclave resides. In this example, the dedicated function is configured to enable a communication path between the application processor and the enclave via the computing device. In addition or alternatively, the system also includes the computing device. In addition or alternatively, the system also includes memory on which the enclave is stored. In another example, the PCIe accelerator apparatus further includes a cryptographic engine configured to encrypt information entering the PCIe accelerator apparatus. In another example, the PCIe accelerator apparatus further includes a cryptographic engine configured to decrypt information leaving the PCIe accelerator apparatus. In this example, the cryptographic engine is a line-rate cryptographic engine. In addition or alternatively, the cryptographic engine is arranged in a PCIe path of all of the one or more PCIe accelerators. In addition or alternatively, the PCIe accelerator apparatus further comprises an application processor configured to manage keys used by the cryptographic engine.

Another aspect of the disclosure provides a method for providing a secure collaboration between one or more PCIe accelerators and an enclave. The method includes retrieving, by one or more PCIe accelerator, encrypted one or both of code or data out of memory of a host computing device; decrypting, by the one or more PCIe accelerator, the encrypted one or both of code or data using a cryptographic engine; processing, by the one or more PCIe accelerators, the unencrypted one or both of code or data using and generate results; encrypting, by the one or more PCIe accelerators, the results; and sending, by the one or more PCIe accelerators, the encrypted results back to the memory of the host computing device for storage.

In one example, the method also includes negotiating, by the one or more PCIe accelerators, a cryptographic session with an enclave. In another example, the cryptographic session is negotiated through host OS-mediated communication. In another example, the encrypted one or both of code or data are retrieved using direct memory access. In another example, the encrypted results are sent using direct memory access.

DETAILED DESCRIPTION

Overview

Figure 1:
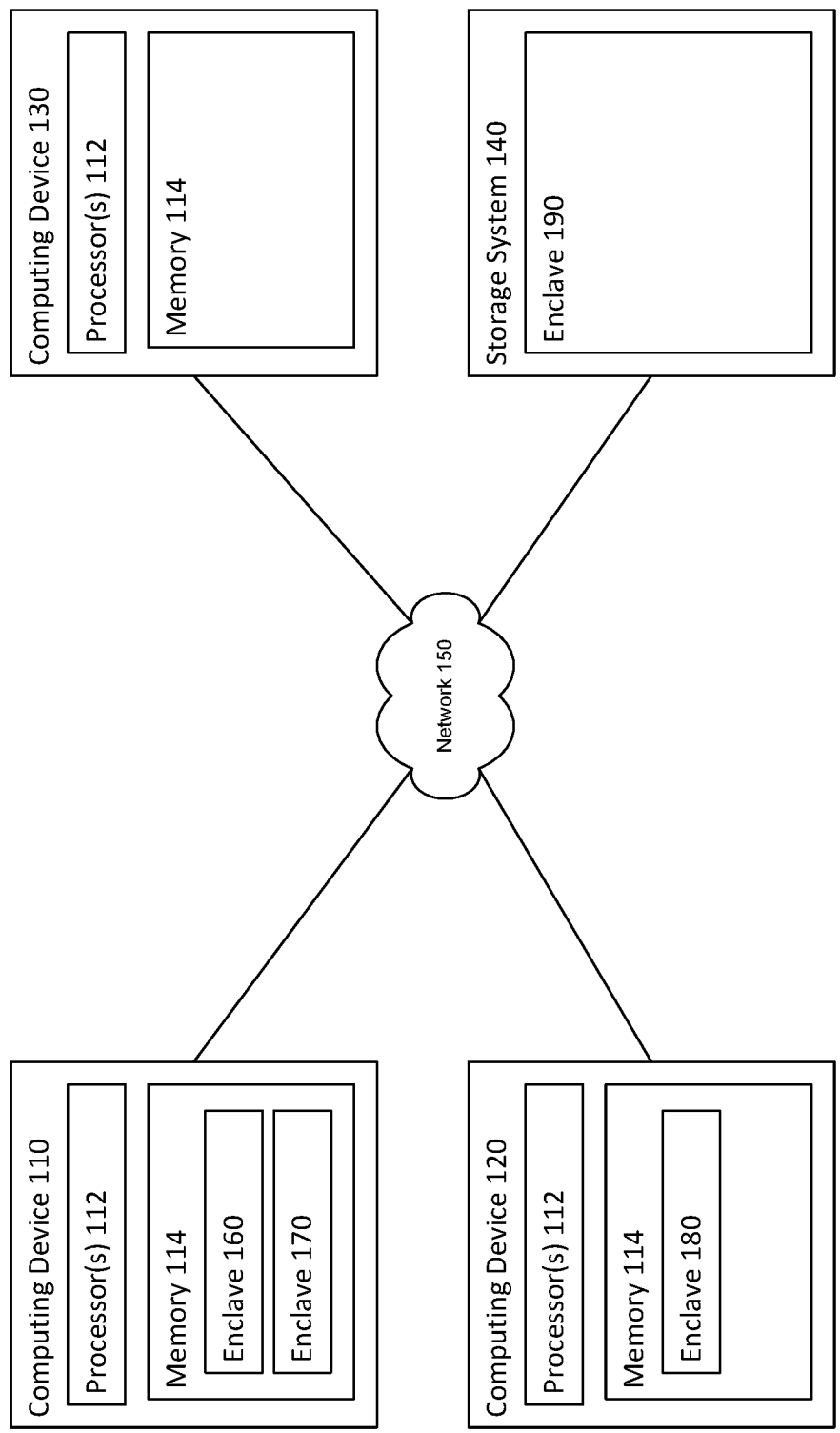
FIG. 1 is a functional diagram of an example system in accordance with aspects of the disclosure.

Aspects of the disclosure relate to enabling secure collaboration between CPUs and processing accelerators using an enclave-based system. For instance, a computing device may include a plurality of processors and memory. The memory may include one or more enclaves that can be used to store data and instructions while at the same time limit the use of such data and instructions by other applications. For instance the data may include sensitive information such as passwords, credit card data, social security numbers, or any other information that a user would want to keep confidential. The plurality of processors may include CPUs as well as hardware based processors or accelerators such as Peripheral Component Interconnect Express (PCIe) accelerators including special-purpose integrated circuits that can be used to perform neural network computations.

In order to secure the processing of a PCIe accelerator, a PCIe accelerator apparatus may include hardware that may be arranged on the circuit board with one or more PCIe accelerators in order to give the PCIe accelerator apparatus a cryptographic hardware identity and the ability to perform authenticated encryption and/or decryption. For instance, an application that wants to use a PCIe accelerator securely, may runs its application logic as well as the entire or one or more parts of the PCIe accelerator software stack inside an enclave or a set of enclaves.

When a computing device's operating system allocates one or more PCIe accelerators for use by an application, a PCIe accelerator apparatus and the enclave may negotiate a cryptographic session through OS-mediated communication. The enclave may then use this cryptographic session to encrypt the PCIe accelerator code and data, and may hand those out to the OS, which, in turn may hand them to the one or more PCIe accelerators. The one or more PCIe accelerator retrieve the code and/or data out of the computing device's memory, decrypt those using a cryptographic engine, process the data using the code, and generate results. The one or more PCIe accelerator also encrypt the results with the same cryptographic session before sending them back to memory of the processing device.

For instance, in order to provide a secure collaboration between processors and processing accelerators in enclaves, a PCIe accelerator apparatus may include a plurality of PCIe accelerators arranged on a circuit board, an application processor, a microcontroller and a cryptographic engine.

The microcontroller may endow the PCIe accelerator apparatus with a cryptographic hardware identity and also ensures the integrity of the code running on the AP. The application processor may also utilize services provided by the microcontroller to assert the PCIe accelerator apparatus's hardware identity during session establishment between the enclave and the application processor. The cryptographic engine may be arranged in the PCIe direct memory access (DMA) path of the PCIe accelerator and may provide encryption and decryption operations for the PCIe accelerators. The application processor may be configured to manage the keys used by the cryptographic engine and may also be responsible for ensuring semantic integrity of any buffers being decrypted by the cryptographic crypto engine.

The features described here provide for secure processing of information on a processing accelerator such as a TPU, a GPU, or other types of PCIe accelerators. This is achieved by providing additional hardware on a circuit board of one or more PCIe accelerator to provide that apparatus with a cryptographic hardware identity and the ability to perform authenticated encryption and decryption at PCIe line rate with minimal additional latency. In addition, the features described herein may enable PCIe accelerator to directly consume data that is encrypted at rest, without it having to be decrypted and re-encrypted with the session key.

EXAMPLE SYSTEMS

FIG. 1 includes an example enclave system 100 in which the features described herein may be implemented. It should not be considered as limiting the scope of the disclosure or usefulness of the features described herein. In this example, enclave system 100 can include computing devices 110, 120, 130 and storage system 140 connected via a network 150. Each computing device 110, 120, 130 can contain one or more processors 112, memory 114 and other components typically present in general purpose computing devices.

Although only a few computing devices and a storage systems are depicted in the system 100, the system may be expanded to any number of additional devices. In addition to a system including a plurality of computing devices and storage systems connected via a network, the features described herein may be equally applicable to other types of devices such as individual chips, including those incorporating System on Chip (Soc) or other chips with memory, that may include one or more enclaves.

Memory 114 of each of computing devices 110, 120, 130 can store information accessible by the one or more processors 112, including instructions that can be executed by the one or more processors. The memory can also include data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data may be retrieved, stored or modified by the one or more processors 112 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. In addition or alternatively, the processors can be dedicated components such as an application specific integrated circuit ("ASIC") or other hardware-based processor, such as PCIe accelerators including Tensor Processing Units (TPU), graphical processing units (GPU), etc. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processors, memory, and other elements of computing device 110 as being within the same block, the processors, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 120, 130 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Like the memory discussed above, the storage system 140 may also store information that can be accessed by the computing devices 110, 120, 130. However, in this case, the storage system 140 may store information that can be accessed over the network 150. As with the memory, the storage system can include any non-transitory type capable of storing information accessible by the processor, such as a hard-drive, memory card, ROM, RAM, DVD, CD-ROM, write-capable, and read-only memories.

In this example, the instructions of each of computing devices 110, 120, 130 may include one or more applications. These applications may define enclaves 160, 170, 180, 190 within memory, either locally at memory 114 or remotely at the storage system 140. Each enclave can be used to store data and instructions while at the same time limit the use of such data and instructions by other applications. For instance the data may include sensitive information such as passwords, credit card data, social security numbers, or any other information that a user would want to keep confidential. The instructions may be used to limit the access to such data. Although computing device 110 includes only two enclaves, computing device 120 includes only 1 enclave, computing device 130 includes no enclaves, and storage system 140 includes only 1 enclave, any number of enclaves may be defined with the memory of the computing devices 110, 120 or storage system 140.

Figure 2:
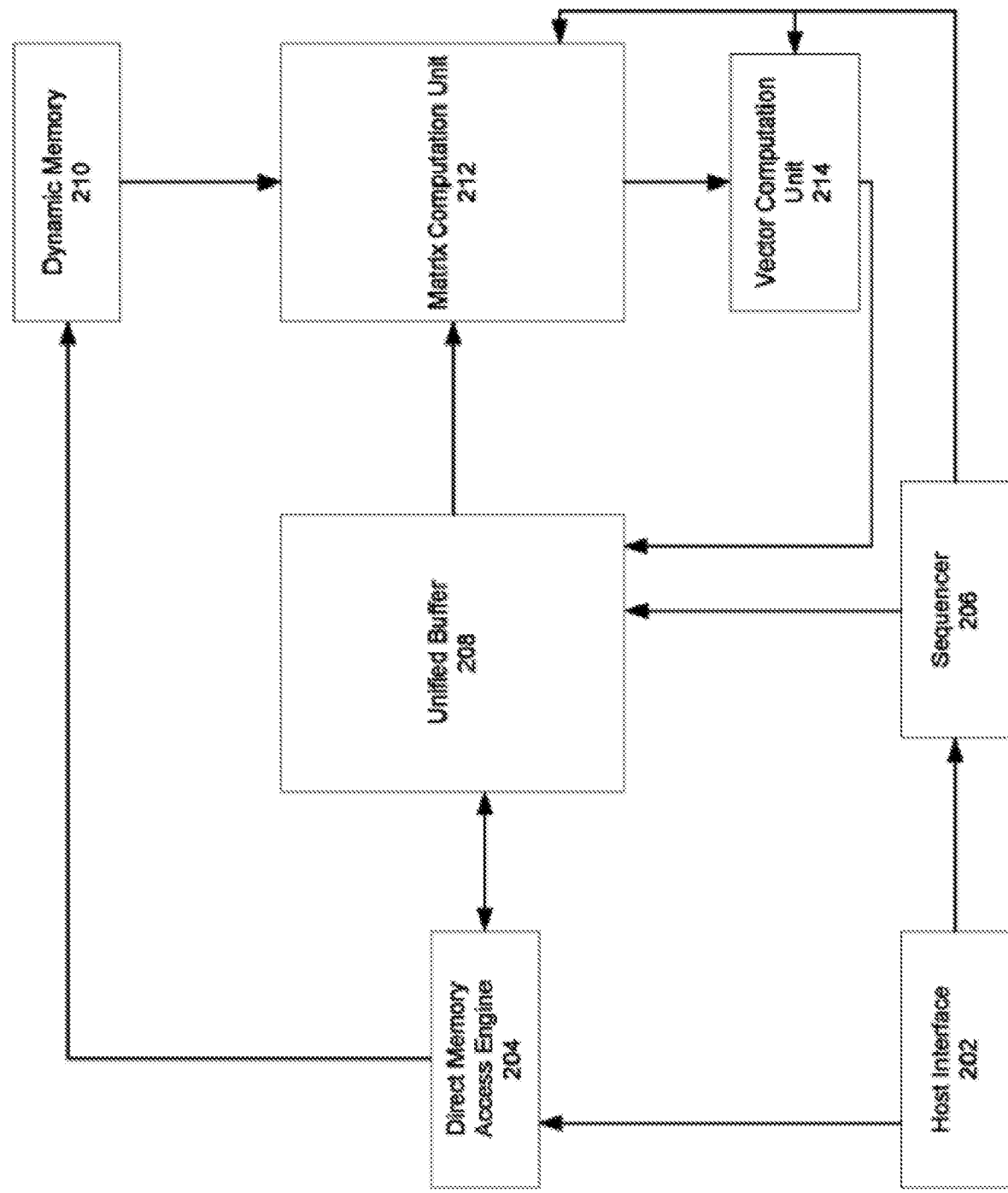
FIG. 2 is a functional diagram of an example Tensor Processing Unit (TPU) in accordance with aspects of the disclosure.

As noted above, processors 112 may include CPUs as well as hardware based processors or accelerators such as TPUs, GPUs, and other PCIe accelerators. A TPU is a special-purpose integrated circuit that can be used to perform neural network computations. As shown in the example functional diagram of a TPU 200 in FIG. 2, a TPU may include host interface 202. The host interface 202 can include one or more PCIe connections that enable the TPU 200 to receive instructions that include parameters for a neural network computation. The host interface 202 can send the instructions to a sequencer 206, which converts the instructions into low level control signals that control the circuit to perform the neural network computations. The sequencer 206 can send the control signals to a unified buffer 208, a matrix computation unit 212, and a vector computation unit 214. In some implementations, the sequencer 206 also sends control signals to a DMA engine 204 and dynamic memory 210 which can be a memory unit. The host interface 202 can send sets of weight inputs and an initial set of activation inputs to the DMA engine 204. The DMA 204 can store the sets of activation inputs at the unified buffer 208.

The unified buffer 208 is a memory buffer. It can be used to store the set of activation inputs from the DMA engine 204 and outputs of the vector computation unit 214. The DMA engine 204 can also read the outputs of the vector computation unit 214 from the unified buffer 208. The dynamic memory 210 and the unified buffer 208 can send the sets of weight inputs and the sets of activation inputs, respectively, to the matrix computation unit 212. The matrix computation unit 212 can process the weight inputs and the activation inputs and provide a vector of outputs to the vector computation unit 214. In some implementations, the matrix computation unit sends the vector of outputs to the unified buffer 208, which sends the vector of outputs to the vector computation unit 214. The vector computation unit can process the vector of inputs and store a vector of processed outputs to the unified buffer 208. The vector of processed outputs can be used as activation inputs to the matrix computation unit 212, e.g., for use in a subsequent layer in the neural network.

Figure 3:
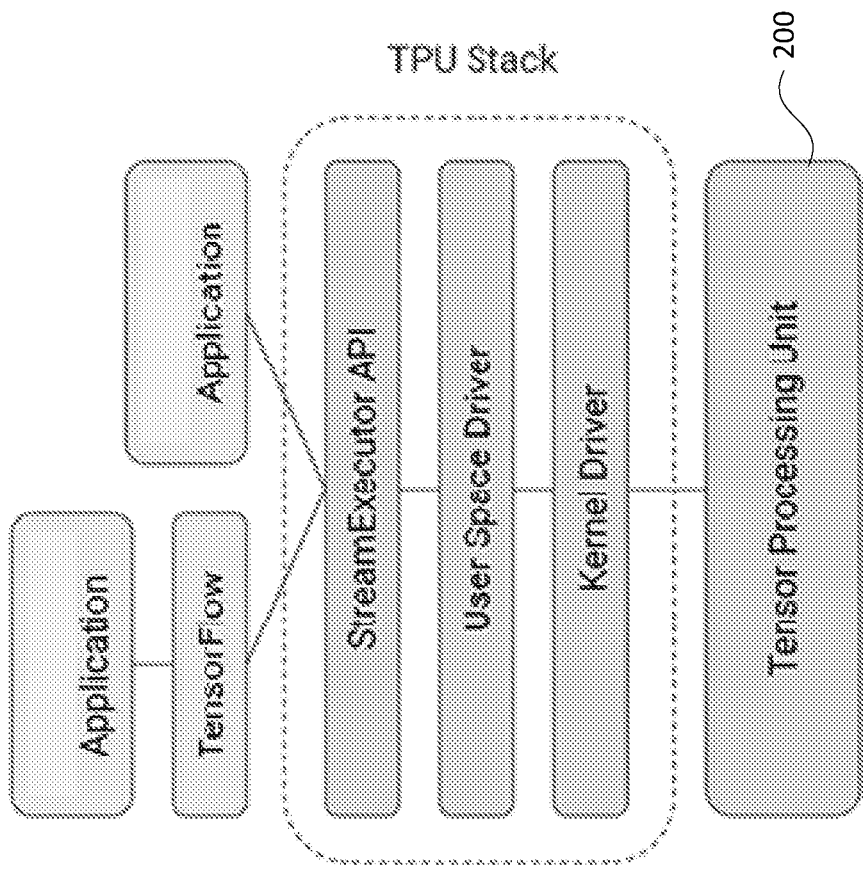
FIG. 3 are example representation of a software stack in accordance with aspects of the disclosure.

FIG. 3 provides an example representation of a TPU software stack. A TPU workload may begin as an application written to an application programming interface (API) for interacting with the TPU such as the TensorFlow software library. API libraries and a compiler running on the host CPU, such as one of the processors 112, may generate the executable instructions for one or more TPUs, for instance, based on a sequence of API calls to the TensorFlow library. The application, utilizing the services exposed by a kernel driver program of the computing device 110, may communicate memory-locations of the generated code buffers as well as data buffers to the TPU. Using the DMA engine 204, the TPU DMAs the generated executable instructions, along with the associated data from the host memory, such as memory 114, into local memory of the TPU, such as the dynamic memory 210 and the unified buffer 208 discussed above. The TPU then executes the DMA-ed instructions, processing the fetched data from the host memory to generate the output. Finally, the TPU DMAs the results back into the host memory, where the application picks the results up.

In order to secure the processing of a TPU, hardware may be arranged on the TPU circuit board in order to give the TPU or that entire apparatus a cryptographic hardware identity and the ability to perform authenticated encryption and/or decryption at PCIe line rate with minimal additional latency. For instance, an application that wants to use TPUs securely, may run its application logic as well as the entire or one or more parts of the TPU software stack inside an enclave or a set of enclaves. Where multiple enclaves are involved, a "primary" enclave may be responsible for dealing with the one or more TPUs and the primary and other enclave or enclaves may communicate with one another over secure connections for instance, using a remote procedure call handshake protocol which enables secure communications between different entities.

Figure 4:
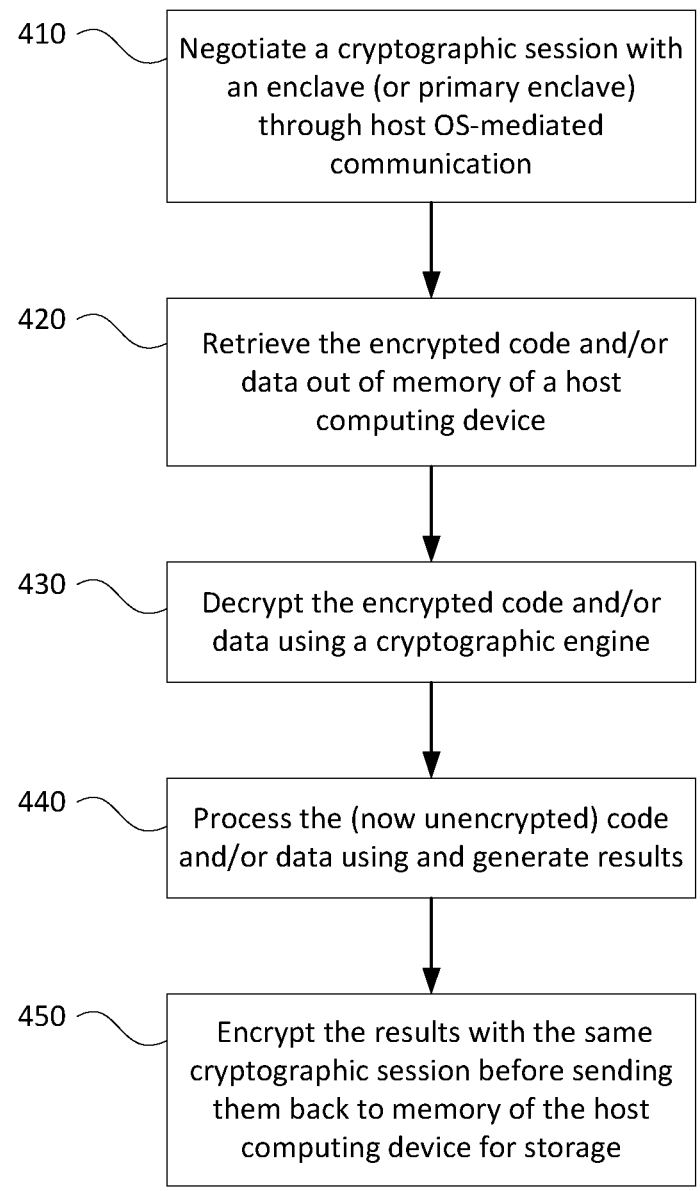
FIG. 4 is an example flow diagram in accordance with aspects of the disclosure.

In some instances, the host operating system (OS) may allocates one or more PCIe accelerators for use by the application. FIG. 4 is an example flow diagram of how the PCIe accelerators may operate in order to process data and/or code according to the requirements, needs or requests of the application. For instance, at block 410, one or more PCIe accelerators of a PCIe accelerator apparatus negotiate a cryptographic session with an enclave (or primary enclave) through host OS-mediated communication. The enclave then use this cryptographic session to encrypt the PCIe accelerator code and/or data and sends this encrypted code and/or data out to the host OS, which, in turn may store the encrypted code and/or date in memory to be accessed by the one or more PCIe accelerators. As such, at block 420, the one or more PCIe accelerators retrieve the encrypted code and/or data out of memory of the host computing device. At block 430, the one or more PCIe accelerators decrypt the encrypted code and/or data using a cryptographic engine, such as a cryptographic engine 560 discussed further below. The one or more PCIe accelerators process the (now unencrypted) code and/or data using and generate results at bock 440. The one or more PCIe accelerator also encrypt the results with the same cryptographic session before sending them back to memory of the host computing device for storage at block 450. The encrypted results can then be accessed as needed by the application.

In the example of a TPU-board, the TPU-board may receive encrypted code and/or data, decrypt the received encrypted code and/or data, process the decrypted code and/or data to generate results, encrypt the results, and send the encrypted results back to the host operating system. In order to do so, the TPU-board may negotiate a cryptographic session with the enclave (or primary enclave) through Host OS-mediated communication. The enclave may then use this cryptographic session to encrypt the TPU code and/or data, and sends the encrypted code and/or data t to the Host OS, which, in turn hands them to the one or more TPUs of the TPU-board. As such, the one or more TPUs DMA the code and/or data out of the host memory. The accessed code and/or data is then decrypted using a cryptographic engine of the one or more TPUs. Thereafter the unencrypted code and/or data is processed by the one or more TPUs in order to generate results. The one or more TPUs also encrypt the results with the same cryptographic session before DMA-ing the encrypted results back to host operating system for storage at the host memory. The encrypted results can then be accessed as needed by the application.

This system may enable TPUs to directly consume data that is encrypted at rest, without it having to be decrypted and re-encrypted with the session key. This is needed, for example, to enable users to encrypt their data-sets on premises before transmitting them to third parties. Requiring these data-sets to be decrypted and re-encrypted with the session key may incur unreasonable overheads.

Figure 5:
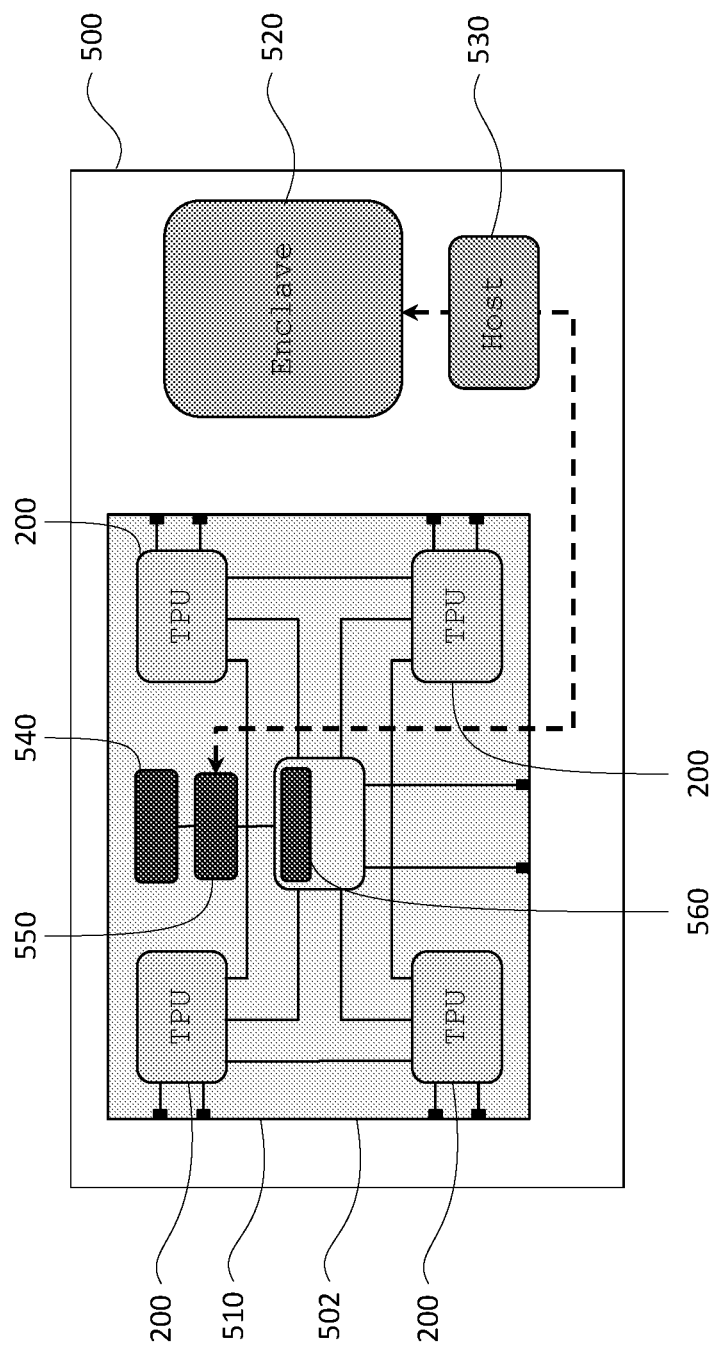
FIG. 5 is a diagram of an example system in accordance with aspects of the disclosure.

FIG. 5 provides a diagram of an example system 500 for providing a secure collaboration between processors and processing accelerators in enclaves. System 500 includes a PCIe accelerator apparatus 502, an enclave 520, and a host 530 including a host OS. In this example, the enclave 520 may represent one or more enclaves such as enclaves 160, 170, 180, or 190, and the host may represent any of computing devices 110, 120, and 130.

The PCIe accelerator apparatus 502 includes a plurality of TPU 200 arranged on a TPU circuit board or TPU board 510, an Application Processor (AP) 540, a microcontroller 550 and the cryptographic engine 560 each connected to the TPU board 510. In some examples, the entire logic on the PCIe board could be integrated into a single ASIC, which is then soldered onto the host computing device's main board. Alternatively, the entire logic could be integrated as an IP block into the SoC containing the CPU.

The AP 540 may be a general-purpose application processor. During operation, the AP 540 may expose a dedicated BDF (Bus/Device/Function) to the host OS. The host OS can use memory mapped input output (MMIO) registers of this BDF to enable a communication path between the enclave 520 and the AP. This communication may be used for enabling session-establishment between the enclave 520 and the AP 540 as well as for session life-time management by the host OS. This interface may also be utilized by the OS to update the firmware of the microcontroller 550.

The microcontroller 550 may be a low-power microcontroller, such as a Titan chip by Google LLC, or a combination of a commercially available low-power microcontroller and a Trusted Platform Module (TPM), which provides hardware security by providing a cryptographic identity to hardware to which the microcontroller is attached. In this regard, the microcontroller 550 may provide the TPU board 510 and/or TPUs 200 with a cryptographic identity.

The microcontroller may include various components such as a secure application processor, a cryptographic co-processor, a hardware random number generator, a key hierarchy, embedded static RAM (SRAM), embedded flash, and a read-only memory block. The microcontroller 550 may include unique keying material securely stored in a registry database. The contents of this database may cryptographically protected using keys maintained in an offline quorum-based Certification Authority (CA). The microcontroller 550 can generate Certificate Signing Requests (CSRs) directed at the microcontroller 550's CA, which can verify the authenticity of the CSRs using the information in the registry database before issuing identity certificates.

The microcontroller-based identity system not only verifies the provenance of the chips creating the CSRs, but also verifies the firmware running on the chips, as the code identity of the firmware is hashed into the key hierarchy of the microcontroller. This property enables remediation and allows us to fix bugs in Titan firmware, and issue certificates that can only be wielded by patched Titan chips. The microcontroller-based identity system may also enable backend systems to securely provision secrets and keys to the host 530, host OS, or jobs running on the host. The microcontroller may also be able to chain and sign critical audit logs and make those logs tamper-evident. To offer tamper-evident logging capabilities, the microcontroller 550 may cryptographically associates the log messages with successive values of a secure monotonic counter maintained by the microcontroller, and signs these associations with the controller's private key. This binding of log messages with secure monotonic counter values ensures that audit logs cannot be altered or deleted without detection, even by insiders with root access to the host 530.

As noted above, the microcontroller 550 may endow the PCIe accelerator apparatus with a cryptographic hardware identity and may also ensure the integrity of the code running on the AP 540. The AP may utilize services provided by the microcontroller to assert the PCIe accelerator apparatus's hardware identity. These services may include, for instance, the microcontroller certifying keys, such as Diffie Hellman keys, generated by the EP as belonging to the AP as well as generating assertions of the microcontroller's identity for authentication and authorization processes.

The cryptographic engine 560 may be arranged in the DMA or PCIe path of the TPUs 200 and may provide encryption and decryption operations for the TPUs 200. The cryptographic engine 560 may enable the TPUs 200 to decrypt information such as code and/or data buffers read from the host memory and encrypt information such as result buffers written back to the host. The cryptographic engine may include a line-rate cryptographic engine. As an example, line-rate may refer to the maximum supported data-transfer rate of the interface; in this case, PCIe. For instance, PCIe gen 3 supports 12.5 giga-bits-per-second of data transfer in each direction, per lane. In a 16-lane interface, this would amount to 25 giga-bytes-per-second data transfer rate in each direction. So the cryptographic engine must be enabled enough to support 25 giga-bytes-per-second of decrypt and 25 giga-bytes-per-second of encrypt.

The AP 540 may be configured to manage the keys used by the cryptographic engine 560. The AP 540 may also be responsible for ensuring semantic integrity of any buffers being decrypted by the cryptographic engine 560. This will allow the TPUs to utilize decrypted buffers in a manner the source enclave, for instance, enclave 520, intended them to utilize the buffer. As such, for example, the host OS would not be able to confuse the TPU into using a data buffer as a code buffer. The enclave 520 will create a small amount of semantic metadata, cryptographically bind it to each of the DMA buffers including the code and/or data being transferred from the host to the TPUs and communicate the information to the AP 540. The AP will then utilize this information to direct the DMA crypto engine appropriately. In some instances, AP 540 and the microcontroller 550 may be the same physical chip.

In operation, the aforementioned security details may be "hidden" from the programmer of the application. From the programmer's point of view, it should be possible to enable a few compile-time flags to get the protections without having to rewrite the programmer's code.

Encrypting the code and/or data buffers on CPU, only to be decrypted on the TPU may add performance bottlenecks. Enabling TPUs to directly DMA into an enclave's memory might ease such bottlenecks. This may require additional features. For instance, enclave implementations may need to add enhancements to selectively allow accelerator-initiated DMA from trusted accelerators. The enclave code must have control over which accelerators it wants to trust. In addition, accelerators may need to be endowed with industry-standard cryptographic identity. This identity must be verified by an input-output memory management unit (IOMMU) that allows an enclave to specify which of the verified identities are trusted. In addition, accelerators, at least to some extent, may need to understand the enclave access-control model as well as CPU virtual addresses while also utilizing ATS (Address Translation Service) and translation caching to prevent OS tampering.

At present, TPUs are single-context devices. That is, a collection of TPUs can only work on one application at a time. In the event that TPUs are expanded into multi-context devices, the features described herein can be applied to multi-context TPUs as well. In addition, although the examples herein relate specifically to TPUs, the features described herein may be applied to other types of PCIe accelerators, such as GPUs, as well.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for providing a secure collaboration between one or more PCIe accelerators and an enclave defined within memory of a host computing device, the system comprising:
 a PCIe accelerator apparatus including:
   the one or more PCIe accelerators;
   a microcontroller configured to provide a cryptographic hardware identity to the PCIe accelerator apparatus, wherein the PCIe accelerator apparatus is configured to use the cryptographic hardware identity to negotiate a cryptographic session between the PCIe accelerator apparatus and the enclave; and
   a cryptographic engine separate from the one or more PCIe accelerators and arranged in a PCIe path of the one or more PCIe accelerators to provide encryption and decryption operations between the one or more PCIe accelerators and the enclave during the cryptographic session.

2. The system of claim 1, further comprising a circuit board on which each of the one or more PCIe accelerators and the microcontroller are arranged.

3. The system of claim 1, wherein each of the one or more PCIe accelerators is one of a tensor processing unit or a graphical processing unit.

4. The system of claim 1, wherein the PCIe accelerator apparatus further comprises an application processor configured to communicate with the enclave.

5. The system of claim 4, wherein the application processor is incorporated into the microcontroller.

6. The system of claim 4, wherein the application processor further includes a dedicated function for communicating with an operating system of a computing device on which the enclave resides.

7. The system of claim 6, wherein the dedicated function is configured to enable a communication path between the application processor and the enclave via the computing device.

8. The system of claim 1, wherein the cryptographic engine is configured to decrypt information from the enclave that is entering the PCIe accelerator apparatus during the cryptographic session.

9. The system of claim 1, wherein the cryptographic engine is configured to encrypt information from the PCIe accelerator apparatus that is entering the enclave during the cryptographic session.

10. The system of claim 1, wherein the cryptographic engine is a line-rate cryptographic engine.

11. The system of claim 1, wherein the PCIe accelerator apparatus further comprises an application processor configured to manage keys used by the cryptographic engine.

12. The system of claim 1, wherein the cryptographic engine is a separate component from the one or more PCIe accelerators in the PCIe accelerator apparatus.

13. The system of claim 1, wherein the cryptographic engine is arranged between the one or more PCIe accelerators and the enclave.

14. A method for providing a secure collaboration between one or more PCIe accelerators of a PCIe accelerator apparatus and an enclave defined within memory of a host computing device, the method comprising:

negotiating, by the PCIe accelerator apparatus, a cryptographic session with the enclave using a cryptographic hardware identity provided by a microcontroller of the PCIe accelerator apparatus; and during the cryptographic session:

retrieving, by the PCIe accelerator apparatus, encrypted one or both of code or data from the enclave;

decrypting, by a cryptographic engine of the PCIe accelerator apparatus, the encrypted one or both of code or data, the cryptographic engine being separate from the one or more PCIe accelerators and arranged in a PCIe path of the one or more PCIe accelerators;

retrieving, by the one or more PCIe accelerators, the unencrypted one or both of code or data;

processing, by the one or more PCIe accelerators, the unencrypted one or both of code or data to generate results;

encrypting, by the cryptographic engine, the results; and sending, by the PCIe accelerator apparatus, the encrypted results back to the enclave.

15. The method of claim 14, wherein the cryptographic session is negotiated through host OS-mediated communication.

16. The method of claim 14, wherein the encrypted one or both of code or data are retrieved using direct memory access.

17. The method of claim 14, wherein the encrypted results are sent using direct memory access.

18. A non-transitory computer-readable medium storing instructions executable by one or more processors for providing a secure collaboration between one or more PCIe accelerators of a PCIe accelerator apparatus and an enclave defined within memory of a host computing device, the instructions comprising:

negotiating a cryptographic session with the enclave using a cryptographic hardware identity provided by a microcontroller of the PCIe accelerator apparatus; and during the cryptographic session:

retrieving encrypted one or both of code or data from the enclave;

decrypting the encrypted one or both of code or data using a cryptographic engine, the cryptographic engine being separate from the one or more PCIe accelerators and arranged in a PCIe path of the one or more PCIe accelerators;

retrieving the unencrypted one or both of code or data;

processing the unencrypted one or both of code or data to generate results;

encrypting the results using the cryptographic engine; and sending the encrypted results back to the enclave.

* * * * *